United States Patent [19]
Taylor

[11] Patent Number: 5,110,462
[45] Date of Patent: May 5, 1992

[54] CONDENSER/MEMBRANE PERMEATER

[75] Inventor: John A. Taylor, Pinckney, Mich.

[73] Assignee: Separation Dynamics, Inc., Southfield, Mich.

[21] Appl. No.: 735,865

[22] Filed: Jul. 25, 1991

Related U.S. Application Data
[62] Division of Ser. No. 443,335, Nov. 30, 1989.

[51] Int. Cl.$^5$ .............................................. B01D 53/22
[52] U.S. Cl. ................................... 210/180; 210/188; 210/500.29
[58] Field of Search ............... 210/188, 321.6, 500.29, 210/644, 180; 55/189, 208, 159

[56] References Cited
U.S. PATENT DOCUMENTS
3,591,667 7/1971 Kulshrestha ............... 210/500.29 X Primary Examiner—Frank Spear
Attorney, Agent, or Firm—Reising, Ethington, Barnard, Perry & Milton

[57] ABSTRACT

An apparatus and method for separating and removing volatiles from a fluid such as air. The apparatus includes a container for containing a liquid (16) including volatiles therein. The volatiles are vaporized from the liquid (16) in the container (14) into the gaseous atmospheric space (18) adjacent thereto. The mixture of volatiles and air are conducted to a separating module (40) including membranes (48) where the air is imbibed into the membranes (48) of the module while the volatiles are condensed on the membrane and collected in a condensate collection chamber (34).

12 Claims, 2 Drawing Sheets

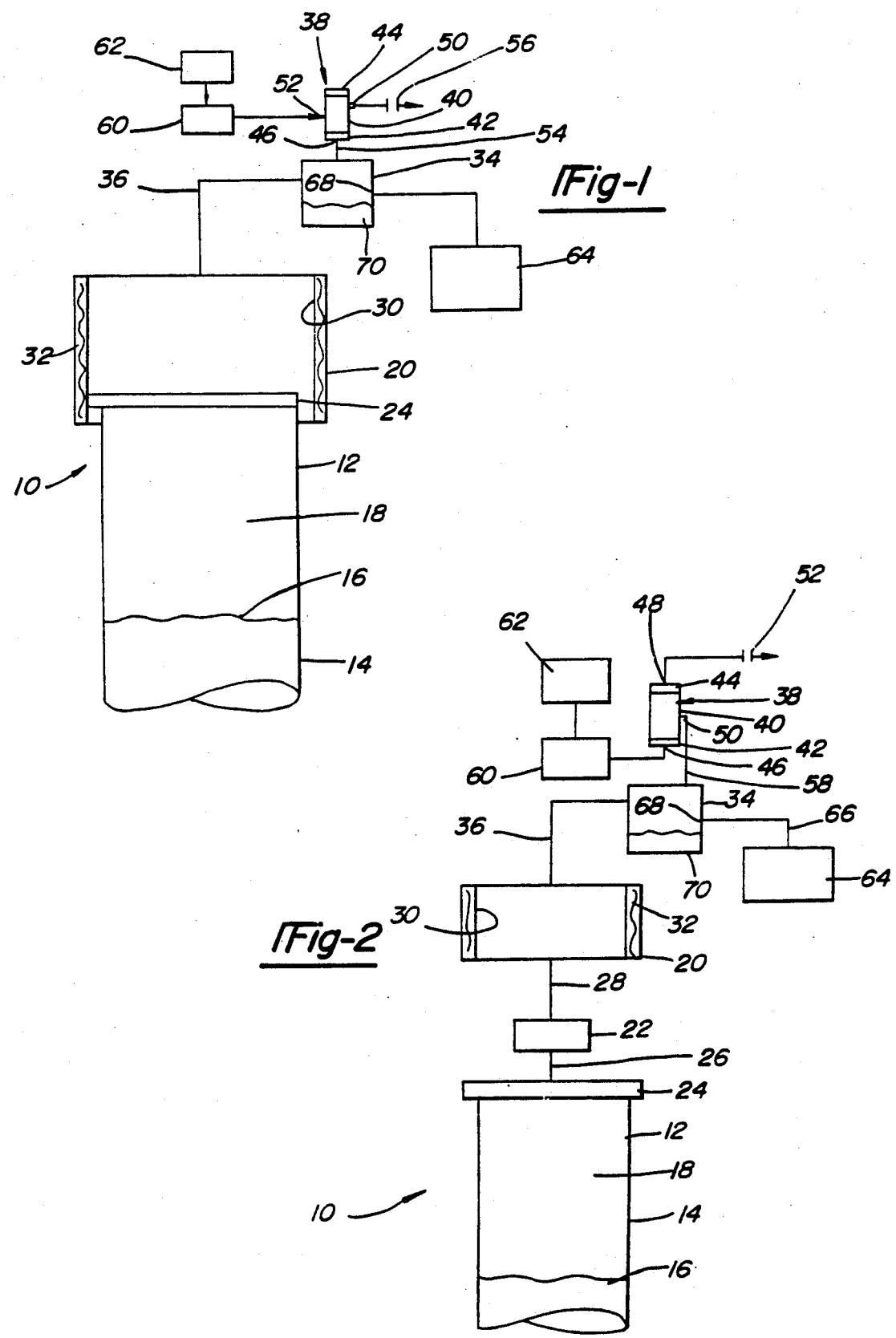

CONDENSER/MEMBRANE PERMEATER

This is a division of application Ser. No. 443,335, filed on Nov. 30, 1989.

TECHNICAL FIELD

The present invention relates to apparatus and method of removing volatiles from a liquid. More specifically, the present invention relates to a combination of means for removing vaporized volatiles from water and then separating clean air from the volatiles while trapping the condensed volatiles.

BACKGROUND OF THE INVENTION

There are many industrial and environmental situations where water is isolated in a container, the water having volatiles contained therein. Commonly, air strippers are used to remove the volatiles from the water. The air stripper would include a pump for creating a vacuum over the water thereby causing the water to release the volatiles therefrom. Commonly, the air containing the volatiles is pumped from the tank into the atmosphere.

Recent environmental legislation prohibits much of the use of these air strippers in an uncontrolled fashion. To control the release of the volatiles into the atmosphere, carbon filters have been used to absorb the volatiles. These filters foul over time and must be replaced.

The inventor of the present invention has made several advances in the use of membrane technology for separating fluids, such as water and water soluble substances from relatively hydrophobic materials. For example, the U.S. Pat. No. 4,857,081 to Taylor, issued Aug. 15, 1989, discloses an apparatus and method for separating water from a water and hydrocarbon mixture and water from a water and halogenated hydrocarbon mixture. The device consists essentially of nonporous self-supported hollow fibers of regenerated cuproammonium cellulose. The membranes have the capacity of imbibing water from a stream of hydrocarbons or halogenated hydrocarbons contaminated with water. The water defuses to the other side of the membrane and is then removed from the other side of the membrane.

The inventors copending application Ser. No. 402,229 to Taylor, filed Sept. 5, 1989 discloses a composite membrane including a porous support membrane and a nonporous water and water soluble substance permeating membrane, such as the nonporous cuproammonium regenerated cellulose disposed over each of the pores for selectively permeating only water and water soluble substances through each of the pores.

Applicant herein provides a novel apparatus and method incorporating into the method a modified Soxhlet trap to provide a substantially passive, very low energy means of removing volatiles from water, retrieving the air used in the process as clean air back to the environment, and capturing the dense volatiles.

S. Franz Soxhlet (1848-1913) was a German food analyst. Soxhlet invented an apparatus including a flask and a condenser for the continuous extraction of alcohol-or ether-soluble materials. The apparatus is a closed system wherein a flask containing solvent and the soluble material is heated. The vapor generated therefrom travels through a 90 degree bend in a fluid conducting tube to a condensing chamber. The condensing chamber produces condensation of the solvent which travels through another fluid conducting conduit back to the flask while the vapor is released into the atmosphere.

Applicant has modified and combined a Soxhlet type trap with the inventor's novel membranes in order to provide a means for first removing from a water supply and then separating the air used therefor from the volatiles and trapping the volatiles.

SUMMARY OF THE INVENTION

In accordance with the present invention there is provided a method of removing volatiles from a liquid having a gaseous atmospheric space adjacent thereto, the method including the steps of vaporizing volatiles from a liquid into the gaseous atmospheric space adjacent the liquid, conducting the gaseous atmosphere containing the volatiles from the space, separating through a membrane a volatile free gaseous atmosphere permeate from a volatile retentate and containing the volatile retentate.

The present invention further provides an apparatus for removing volatiles from a liquid, the apparatus including container means for containing the liquid including volatiles therein, the container means defining a gaseous atmospheric space adjacent to the liquid. Vaporizing means vaporizes the volatiles from the liquid in the container into the gaseous atmospheric space. Conducting means are in fluid communication with the vaporizing means for conducting the gaseous atmosphere containing the from the space. Separating means includes at least one membrane having one side in fluid communication with the conducting means for separating a volatile free atmospheric permeate from a volatile retentate to a second side of the membrane. Collecting means removes the volatile retentate from the one side of the membrane and contains the collected volatile retentate. The separating means includes a fluid outlet for releasing the volatile free atmospheric permeate from the separating means.

FIGURES IN THE DRAWINGS

Other advantages of the present invention will be readily appreciated as the same becomes better understood by reference to the following detailed description when considered in connection with the accompanying drawings wherein:

FIG. 1 is a schematic representation of a device constructed in accordance with the present invention;

FIG. 2 is a schematic representation of a second embodiment of the present invention;

DETAILED DESCRIPTION OF THE INVENTION

Figure 3:
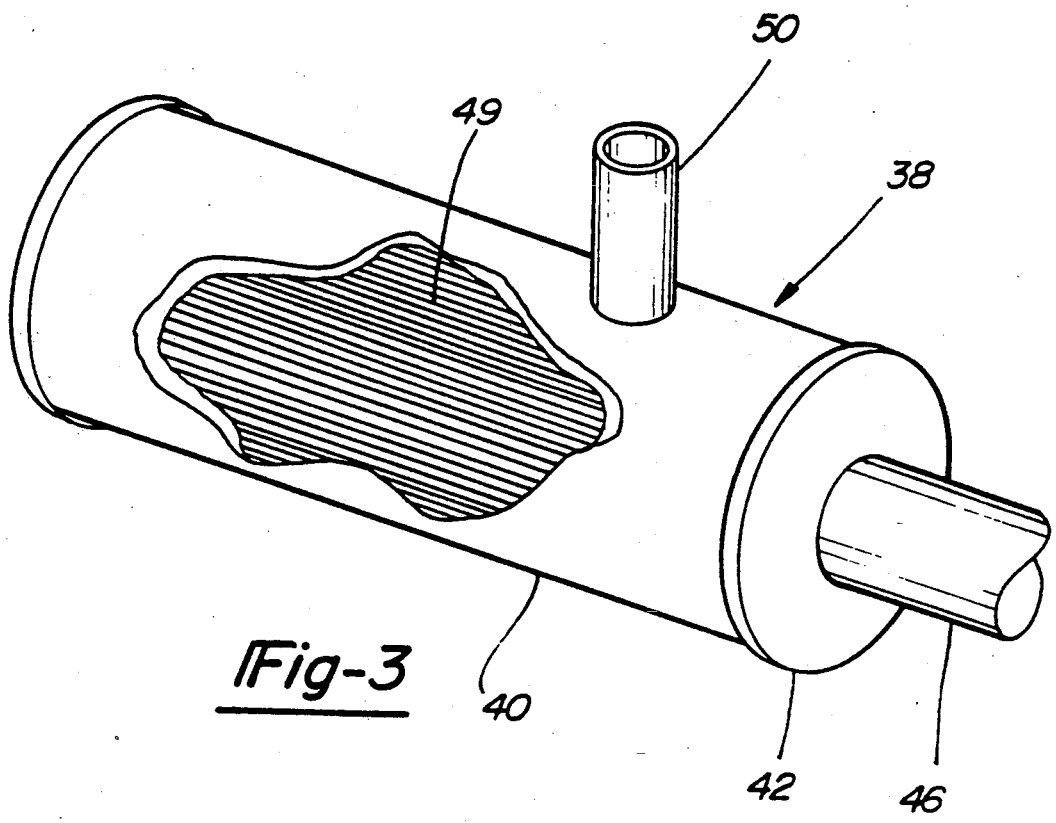
FIG. 3 is an enlarged fragmentary partially broken away view of a membrane module constructed in accordance with the present invention.

An apparatus constructed in accordance with the present invention is generally shown at 10 in FIG. 1. The apparatus is shown schematically as a stack 12 extending upwardly from fluid chamber 14. The fluid chamber 14 contains water 16 therein. Such a stack is commonly found in an air stripper assembly. However, it should be noted that the present invention can also be utilized with other systems where vaporized fluids are to be separated, such as the separation of paint solvent vapors from air rom paint spray booths.

The chamber 14 provides means for containing the water 16, the water 16 including volatiles such as aliphatic, aromatic, alicyclic, oxygenated, organic compounds therein. The stack 12 defines a gaseous atmospheric space 18 above and adjacent to the water 16.

The apparatus 10 includes a heat chamber 20 in fluid communication with the stack 12. The heat chamber 20 acts as vaporizing means for further vaporizing the volatiles from the water 16 in the container 14 into the gaseous atmospheric space 18. As shown in FIG. 2, the heat chamber may work in conjunction with a pump 22 which creates a negative pressure in the atmospheric space 18 which further promotes vaporization of the volatiles from the fluid 16.

More specifically, the top of the stack 12 is capped by a cap member 24. In the apparatus 10 shown in FIG. 1, the heat chamber 20 is disposed over the cap 24 and perfects a seal therewith to create a heat chamber directly above and in fluid communication with the stack 12. As shown in the alternative embodiment of the apparatus 10' in FIG. 2, a conduit 26 allows fluid communication from the stack 12 through the pump 22 and then through conduit 28 to the heat chamber 20'. By the pump 22 creating a negative pressure within the stack 12, the surface tension of the water is reduced and the volatiles more readily vaporize into the adjacent atmospheric space 18.

The heat chamber 20,20' can include an inner chamber 30 surrounded by a heat generating mechanism, such as heating coils 32. The heating coils 32 create sufficient heat within the heat chamber 20,20' as to further induce vaporization of the volatiles, the volatiles being mixed with some water vapor and air.

The assembly 10,10' includes a condensate chamber 34 in fluid communication with the heat chamber 20 through a substantially 90 degree bend fluid conduit 36. The condensate collection chamber 34 is analogous to a Soxhlet condenser in that it is used to collect the condensed volatiles and separate it from the air contained therein. In order to achieve this end, the condensate collection chamber 34 is in fluid communication with a separation module generally indicated at 38, the separation module 38 including membranes therein having one side in fluid communication with the condensate collection chamber 34 for separating a volatile free atmospheric permeate from a volatile retentate to a second side of the membranes.

More specifically, the separation module 38 is shown in detail in FIG. 3. The module 38 includes a shell or housing 40 which is illustrated in the form of an elongated and generally cylindrical housing. Respective ends of the housing 40 are provided with caps 42,44. As shown in FIG. 1, cap 42 includes an inlet port 46 and cap 44 completely seals the other end of the housing 40. As shown in FIG. 2, the second embodiment of the invention includes end cap 44 having a fluid outlet 48 for a purpose to be described below.

Extending axially within the housing 40 and forming the membrane of the present invention is a bundle of hollow fibers 49. At least a portion of each of the fibers 49 includes wet nonporous regenerated cellulose membrane for imbibing only volatile free air permeate therethrough while preventing imbibing of volatiles therethrough. The membrane can take the form of unsupported cuproammonium regenerated cellulose fibers which are nonporous fibers, as disclosed in the previously cited U.S. Pat. No. 4,857,081. Alternatively, the device can include supported hydrophilic membranes, as disclosed in the previously cited copending patent application Ser. No. 402,229. An example of such a fiber is a microporous polypropylene hollow fiber coated on its outside or inside surface with a layer of regenerated cuproammonium cellulose nonporous membrane.

The ends of the membranes are held together by a potting material (not shown) such that the inner aspects of the membranes 49 are in fluid communication with ports 46 and 48 as shown in FIG. 2 or in communication with solely port 46 as shown in FIG. 1. The outer surfaces of the fibers 49 form an outer chamber in combination with the inner wall of the housing 40 which is in fluid communication with ports 50,52 of the housing 40.

As shown in FIG. 1, conduit 54 provides fluid communication between the condensate collection chamber 34 and the housing 40. Conduit 54 is in fluid communication with the inner surfaces of the hollow fiber membranes 49 contained within housing 40. An air outlet 56 is operatively connected to outlet 50 and is in fluid communication with the outer surfaces of the membranes 49 contained within housing 50.

A reverse fluid flow circuit is shown in FIG. 2. Conduit 58 provides fluid communication between the condensate collection chamber 34 and inlet 50 thus providing fluid communication between the condensate and the outer surfaces of the membrane 49 contained within the housing 40. The air outlet 56 is operatively connected to outlet 48 which is in fluid communication with the inner surfaces of the hollow fiber membranes 49. In the two embodiments, the membranes 49 function to allow air flow in an opposite direction therethrough but separate the air from the volatiles in the exact manner, as described below.

A relatively cool air source 60 is in fluid communication through inlet 52 with chamber 40 in FIG. 1 so as to be in fluid communication with the outer surface of the membranes 49 contained within housing 40. Alternatively, as shown in FIG. 2, the cool air source 60 is in fluid communication with the inner surfaces of the membranes 49 through inlet 46. In both embodiments, the cool air generated to flow through the housing 40 and adjacent one surface of the membrane 49 provides condensate inducing means for inducing condensation of the volatiles on the opposite side of the membrane 49 as the volatile free air is imbibed through to the second side of the membrane 49.

A humidifier or humidity injection device 62 is operatively connected to the cool air source 60 to add further humidity to the air stream thereby providing means for continuously wetting the nonporous regenerated cellulose membranes 49. The humidifier can take the form of an ultrasonic humidifier or other means for humidifying an air stream.

It is necessary to keep the nonporous regenerated cellulose membranes 49 wet because in the wet state the nonporous regenerated cellulose membrane 49 selectively imbibe and diffuse air therethrough while preventing the imbibing of volatiles, such as hydrocarbons normally stripped by an air stripper. Thusly, the humidified cool air provides wetting means for continuously wetting the membranes 49 while imparting an imbibing selectivity for the air contained with the volatiles. The air is released into the atmosphere through the air outlet as volatile free air permeate. The volatiles contained within the fibers 49 and prevented from imbibing therein are condensed on the fibers 49 since the fibers 49 cooled by the cool air sweeping over the opposite side of the fibers 49 removes heat from the vaporized volatiles. As the heat is removed from the volatiles, the volatiles condense and fall out from the housing 40 back into the condensate collection chamber 34.

In the embodiment shown in FIG. 1, the volatiles condense on the inner surface of the membranes 49 and are removed through outlet 46 falling by gravity flow into the condensate collection chamber 34. In a similar fashion, in the second embodiment shown in FIG. 2 the volatiles condense on the outer surface of the membranes 49 and flow back into the collection chamber 34 through conduit 58.

The collection chamber 34 is in fluid communication with a volatile trap 64 through conduit 66. The condensate collection chamber 34 includes an outlet 68. When the level of the condensed volatiles 70 within the chamber 34 rises above the level of the outlet 68, the condensed volatiles 70 passively flow through conduit 66 into trap 64. Thusly, the embodiments shown in FIGS. 1 and 2 provide a substantially passive means for removing volatiles from the water 16 and separating air from the volatiles thereby releasing air out through outlet 56 and trapping the volatiles in the trap 64.

Figure 4:
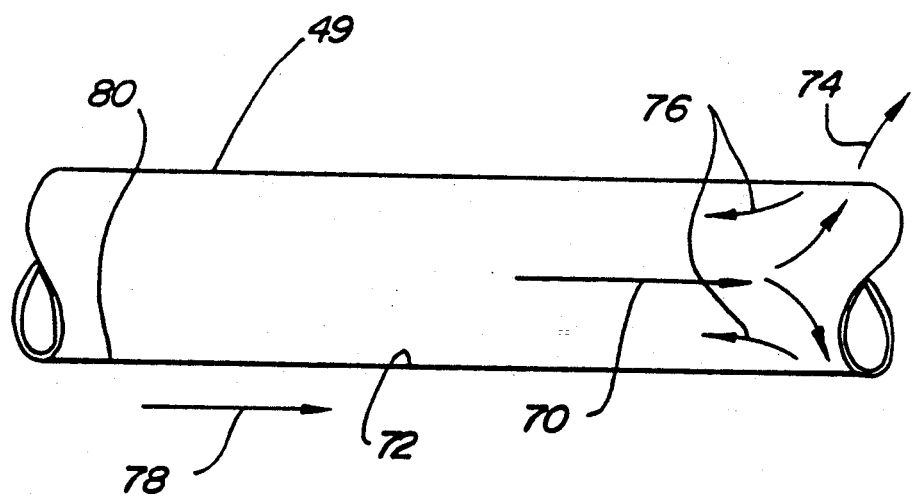
FIG. 4 is a schematic representation of a hollow fiber made in accordance with the present invention illustrating the separation process of the present invention.

FIG. 4 illustrates the cross flow separation process achieved by each fiber 49 within module 40. Arrow 70 indicates the flow of the combination of volatiles plus air through inner core 72 of the membrane 49. As the volatiles and air flow relative to the inner surface 72, air is imbibed into and through the membrane 49 as indicated by arrow 74. Arrows 76 indicate the prevention of the imbibing of the volatiles through the membrane 49. Simultaneously, arrow 78 indicates the flow of cool humid air on the side of the membrane 49 opposite the side containing the mixture of volatiles plus air. The cool humid air cools the membrane 49 so as to induce condensation of the volatiles on the inner surface 80 of the membrane 49. Arrows 76 indicate the flow the condensed volatiles back towards the condensate collection chamber 34, illustrated in FIG. 1. Of course, by utilizing the second embodiment shown in FIG. 2, the flow of the mixture of the volatiles and air would be on the outside of the membrane 49, air being imbibed through the membrane and into the inner core 72 of the membrane 49. In either embodiment, volatile free air is separated from the mixture of volatiles and air while the volatiles condense on the opposite surface of the membrane 49 and flow back down the membrane 49 to the condensate collection chamber 34.

By utilizing the apparatus made in accordance with the present invention as discussed above, and by specifically utilizing the modules containing the hollow fiber membranes, the system not foul and therefore does not need to be replaced as do present systems using activated charcoal. This system has been found to be highly efficient for separating air from the mixture of volatiles and air. Further, the system requires little energy as the separation process is completely passive.

The present invention further provides a novel method of removing volatiles from the liquid 16 having the gaseous atmospheric space 18 adjacent thereto, the method generally including the steps of vaporizing volatiles from the liquid 16 into the gaseous atmospheric space 18 adjacent the liquid 16, conducting the gaseous atmosphere containing the volatiles from the space 18, separating through the membranes 49 a volatile free gaseous atmosphere permeate from the volatile retentate, and containing the volatile retentate 70.

More specifically, the volatiles can be small molecular weight hydrocarbons in the gaseous atmosphere air. In this condition, the separating step previously described can be further defined as imbibing only the volatile free air permeate through the wet regenerated cellulose membranes 49 while preventing imbibing in the volatiles therethrough. The air containing the volatiles is conducted one side of the plurality of hollow fiber nonporous cuproammonium cellulose regenerated membranes 49 and only the volatile free air is imbibed through the membranes 49. The volatile free air permeate is removed from the other side of the membranes 49 while the volatile retentate is removed from the first mentioned side of the membranes 49.

As discussed above, vaporizing can be achieved by creating the negative pressure in the atmospheric space 18 over the liquid 16 for removing the volatiles from the liquid 16 into the atmospheric space 18. Vaporizing can be further achieved by heating the volatiles in the space 18 above the liquid 16, and conducting the heated volatiles into the separate chamber 34. Air is imbibed through the membrane 49 while the volatiles condense on the membrane 49. The condensed volatiles flow back into the separation chamber 34 and are isolated into the trap 64.

As discussed above, humidity can be injected into cool air conducted over the side of the membrane 49 opposite the side containing the mixture of the volatiles and air to further induce condensation of the volatiles on the membrane.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An apparatus (10,10') for removing volatiles from a liquid (16), said apparatus (10,10') comprising: container means for containing the liquid (16) including volatiles therein, said container means (12) defining a gaseous atmospheric space (18) adjacent to the liquid (16); vaporizing means for vaporizing the volatiles from the liquid (16) in the container (14) into said gaseous atmospheric space (18); conducting means in fluid communication with said vaporizing means (20,20',22) for conducting the gaseous atmosphere containing the volatiles from said space (18); separating means (40) including a membrane (49) having one side in fluid communication with said conducting means for separating a volatile free atmospheric permeate from a volatile retentate to a second side of said membrane (49); collecting means for removing the volatile retentate from the membrane (49) and containing the collected volatile retentate, said separating means including a fluid outlet for releasing the volatile free atmospheric permeate therefrom.

2. An apparatus as set forth in claim 1 wherein said membrane (49) includes at least one wet nonporous regenerated cellulose membrane (49) for imbibing only volatile free air permeate therethrough while preventing imbibing of volatiles therethrough.

3. An apparatus as set forth in claim 2 wherein said separating means consists essentially of a plurality of hollow fiber membranes (48) including said wet nonporous regenerated cellulose.

4. An apparatus as set forth in claim 3 wherein said vaporizing means includes a pump (22) in fluid communication with said atmospheric space (18) for creating a negative pressure in said space (18) adjacent to the liquid (16) within said container means (14).

5. An apparatus as set forth in claim 4 wherein said collecting means includes a condenser (34) for condensing the volatile retentate into a liquid (70).

6. An apparatus as set forth in claim 3 or 16 wherein said vaporizing means including heating means (20) for heating the volatiles in the space (18,30) above the liquid (16).

7. An apparatus as set forth in claim 6 wherein said heating means (20) includes a heating chamber (30) in fluid communication with said container means (14) and having a heater jacket (32) disposed thereabout.

8. An apparatus as set forth in claim 7 including a condensate collection chamber (34) in fluid communication between said heating chamber (20) and said separating means (40), said separating means including condensate inducing means for inducing condensation of the volatiles on said one side of said membranes (49) as the volatile free air imbibes through to said second side of said membranes (49), said condensate collection chamber being disposed below said membranes (49) for collecting the condensate by gravity flow.

9. An apparatus as set forth in claim 8 wherein said condensate inducing means including cooling means (10) for cooling said membranes (49) relative to the heated condition of the volatiles.

10. An apparatus as set forth in claim 9 wherein said cooling means includes an air circulator (60) in fluid communication with said second side of said membranes (49) for circulating a relatively cool sweep stream over said second side of said membranes (49).

11. An apparatus as set forth in claim 10 including wetting means (62) for maintaining said membrane (49) in a wet condition.

12. An apparatus as set forth in claim 11 wherein said wetting means including a humidifier (62) in fluid communication with said air circulator (60) for humidifying said sweep stream.

* * * * *